E. C. SINGER.
MACHINE FOR HULLING COTTON SEED.
No. 105,136. Patented July 5, 1870.
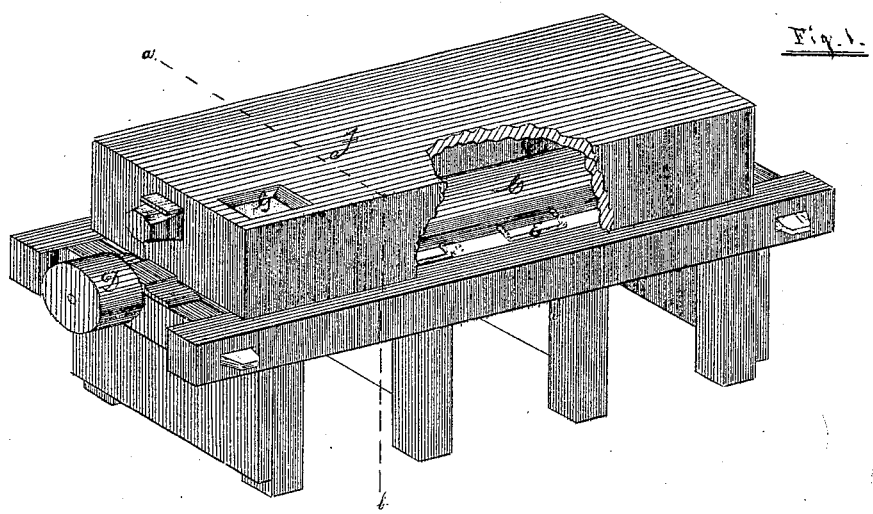
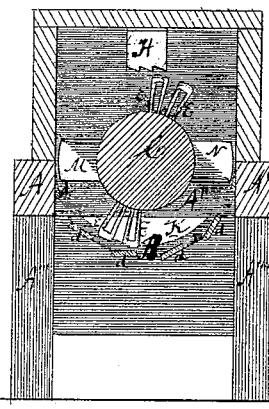
Witnesses.
Rufus R. Rhodes
H. N. Jenkins
Inventor.
Edgar Collins Singer

United States Patent Office.

EDGAR COLLINS SINGER, OF NEW ORLEANS, LOUISIANA.

Letters Patent No. 105,136, dated July 5, 1870.

IMPROVED MACHINE FOR HULLING COTTON-SEED.

The Schedule referred to in these Letters Patent and making part of the same

I, EDGAR COLLINS SINGER, of the city of New Orleans, and State of Louisiana, have invented a certain Improvement in Machines for Hulling Cotton-Seed, of which the following is a specification.

My invention relates to a revolving cylinder, from the perimeter of which project two or more lines of staple-formed beaters, that are slightly winding or spirally placed from one end nearly to the other of said cylinder, and two or more vanes or fans between the points at which said lines of beaters terminate and the proximate end of the cylinder, in combination with a concave bed, of novel formation, below the cylinder, and a bar above it, having a corrugated under surface, the whole being supported on a suitable frame, and working underneath and within a removable cover.

But my invention will be better and more quickly understood by referring to the drawing, whereon—

Figure 1 is a perspective view of my improved machine, with a part of the removable cover or casing broken away to show the relation of the cylinder thereto; and Figure 2, a cross-section through line $a\,b$ of fig. 1.

Within a suitable frame, A A' A'' A''' A'''', I place a concave bed, B, composed of strips $d$, which are rectangular in their cross-sections, and therefore present four sharp edges, as shown.

These strips $d$ are placed just wide enough apart to prevent unhulled cotton-seed from dropping out between them, while the kernel or hulled seed will freely do so, and they are so adjusted that when one of their covers is worn off by use, they can each be taken out and put back in such manner that another corner will be presented at the cutting or hulling-edge, until all four corners have been worn away. When this occurs, new strips must replace the old, in order to maintain the operating capacity of the machine.

Above the concave bed B a cylinder, C, is secured in proper journals in the frame, substantially in the relation to the said bed that is shown on the drawing.

At one of its ends the axis of cylinder C is extended sufficiently beyond or outside the end of the frame to receive on it a drum, D, which constitutes the means for giving motion to the cylinder through the agency of a belt leading to another drum that is driven by any suitable motor or power.

From the circumference of the cylinder C, in slightly winding or spiral lines, and so as to be parallel to each other, project, an inch or more from the surface thereof, the staple-formed beaters $e$. Whatever the projection of these beaters above the perimeter of the cylinder, that projection must be just sufficient to leave an open space between the strips $d$ of the concave bed B and these beaters, to permit a cotton-seed kernel to pass through it without being crushed, but yet not great enough to allow of the passage of the unhulled seed between said strips and the beaters.

On top of the frame a close cover, F, is fitted, in such manner that, while during the operation of the machine it will be maintained immovably in its position, it may yet be readily and quickly removed, whenever occasion shall require its removal.

The machine is fed through an opening, G, in the cover F.

In the center and at the top of the cover F a longitudinal stripper or bar, H, is secured, the lower face of which has a rough or corrugated surface, not unlike a series of saw-teeth in cross-section, as shown at fig. 2. This bar is so adjusted, with respect to the cylinder C, as to leave only sufficient space to prevent contact between its lower surface and the beaters E.

The object of this bar is to throw back any seed which may cling to or otherwise be carried up by the beaters E, when the machine is in operation, and thus cause them to fall back into the concave bed, and, if hulled, to pass out of the same between the strips $d$, or, if not entirely hulled, to be brought again under the action of the beaters.

In some cases I may possibly find it expedient to employ more than one bar H, and I therefore here reserve the right to do so.

The rotation of the cylinder C and, of course, the beaters E, is in the direction which will bring the latter in opposition to the sharp edges presented by the lower surface of bar H, in order the more effectually to cause said bar to fulfill the above-mentioned object.

The hulling is effected by the combined action of the beaters E and the corner edges of the strips $d$ upon the seed in the concave bed in the rapid revolution of the cylinder C. The hulled seeds drop out of this bed through the open spaces between the strips $d$, into any suitable receptacle underneath the machine.

The hulls are thrown out of the machine at the end of it that is opposite to that at which the pulley D is placed, through an opening, K, shown at fig. 2, by a powerful draught that is produced in part by the beaters E, but chiefly by the vanes or fans M N, which, as I have before stated, project from the cylinder C, near that end of it which the lines of beaters do not quite approach.

The beaters co-operate with these fans in producing the requisite draught to expel the hulls through the opening K, because they occupy lines along the perimeter of the cylinder, which are not coincident with lines in correspondence with the axis of said cylinder, and hence present an angle to the line of their rotation or orbit, which produces in their rapid rotation a corresponding divergence in the current of air that is put in motion by such rotation. This current, being toward the end of the cylinder in which the opening K is provided, strikes against the interior surfaces of the machine, and is deflected thereby into said opening.

Another office subserved by the oblique arrangement of the beaters E is to carry the seed gradually away from the point at which they enter the machine, and spread them along the whole length of the concave bed, thereby bringing all the beaters into use, and increasing the rapidity of the operation of hulling the seed. But the current put into motion by the beaters E would not be strong enough to drive all the disengaged hulls out of the machine through the opening K, notwithstanding their extreme levity and susceptibility to the slightest draught of air, and hence I superadd the fans M N, which, being properly placed, and near said opening K, act with such power that a draught is produced which expels nearly every hull or particle thereof through said opening, and hence the kernels or hulled seeds are left in a perfectly clean and winnowed condition, when they fall through the concave bed out of the machine. This I have demonstrated by actual experiment with a full-sized machine recently constructed by me, and there is no other machine in existence which will do it.

Any material that is suitable may be used to make my machine.

I claim as my invention—

The cylinder C, when provided with the beaters E and fans M and N, in combination with a concave bed, B, composed of strips $d$, and a bar, H, in a removable cover, F, when these several parts are constructed, arranged, and operate substantially as and for the purpose set forth.

EDGAR COLLINS SINGER.

Witnesses:
  RUFUS R. RHODES,
  H. N. JENKINS.